May 16, 1944.  E. W. BULLOCK  2,348,785

FLY ASH COLLECTOR

Filed Jan. 9, 1943

INVENTOR
ELLIS W. BULLOCK
BY Henry L. Jennings
ATTORNEY

Patented May 16, 1944

2,348,785

UNITED STATES PATENT OFFICE 2,348,785

FLY ASH COLLECTOR

Ellis W. Bullock, Birmingham, Ala., assignor to Fly Ash Arrestor Corporation, a corporation of Alabama Application January 9, 1943, Serial No. 471,872

5 Claims. (Cl. 183—80)

This invention relates to an ash collector for use in association with solid fuel fired furnaces, and particularly to that class of ash collectors which are mounted in chimneys or flues to separate solids from the combustion gases of such furnaces, and has for an object the provision of an apparatus of the character designated which shall be particularly adapted for the collection of fly ash in a horizontal flue.

A further object of my invention is to provide apparatus of the character designated which shall be effective to arrest and collect fly ash with a minimum of draft loss in the chimney or flue with which it is associated.

In United States Patent No. 2,284,513, issued to R. W. Coward, May 26, 1942, and assigned to Fly Ash Arrestor Corporation, there is shown, described, and claimed, a fly ash collector particularly adapted for installation in a vertical stack or chimney and which embodies a helicoid disposed within the chimney in the path of the gases of combustion and which is surrounded by an annular chamber having slits in the walls through which the fine fly ash passes and falls to the bottom of the chamber by gravity to be removed through a suitable offtake. While the apparatus therein described has proved eminently satisfactory in service, difficulties were encountered when the apparatus was placed in a horizontal position due in part to the large diameter helicoid employed in a vertical stack, necessitating a design of considerable length, and to difficulties encountered in collecting the ash from a horizontal device of such large diameter.

In overcoming these difficulties I break up the combustion gases into a plurality of relatively small paths defined by tubes, in each of which I dispose a helicoid constructed substantially as described in the Coward patent aforesaid, each tube having slots therein formed and positioned substantially as shown and described in the said Coward patent. The helicoids being smaller in diameter, are correspondingly shorter than that shown and described in the Coward patent, and instead of providing an annular chamber entirely around each tube, I place over each a semi-circular hood, and along one side, provide a plate tangential to said hood extending downwardly alongside the tube to prevent interference between the discharges from adjacent tubes. In the design of the apparatus I have further found that the draft loss may be reduced as much as 50% by expanding the entrance ends of the tubes into a bell shape.

Apparatus embodying features of my invention is illustrated in the accompanying drawing forming a part of this application in which Fig. 1 is a side elevational view of the apparatus, partly in section;

Figure 1:
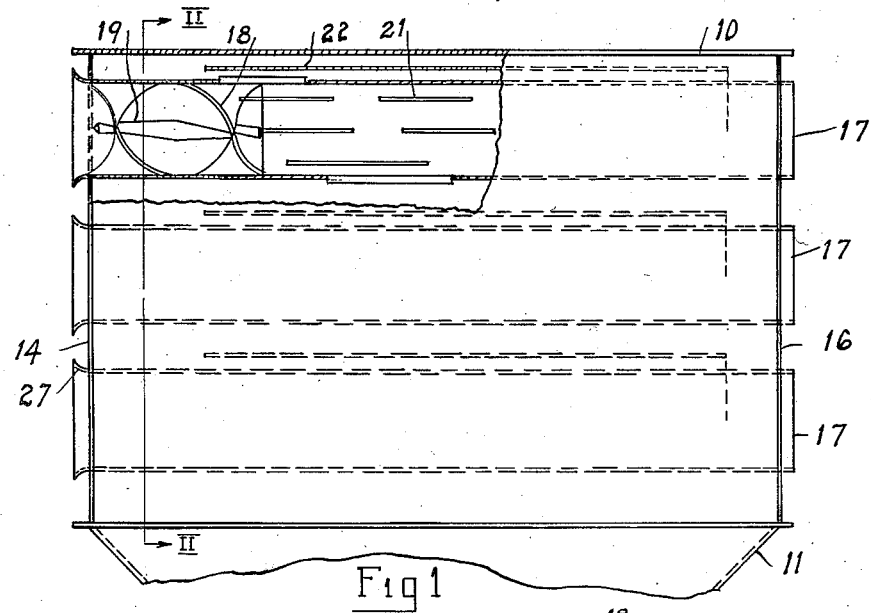

Referring to the drawing my improved apparatus embodies an outer casing 10, provided with a hopper bottom 11, which discharges through a suitable conduit 12, into a receptacle 13. See Fig. 3. The casing 10 is provided with tube sheets 14 and 16 at the ends, and mounted in the tube sheets are a plurality of horizontally disposed relatively closely spaced tubes 17. The tubes 17, as shown in Fig. 2, are arranged in regular spaced horizontal and vertical rows so that ash discharged through openings around the tubes will fall downwardly between them to the hopper bottom 11.

Disposed in each of the tubes 17 is a double helicoid 18 mounted around a central pipe 19. As seen in Fig. 1, the helicoid 18 is disposed at the entrance end of each of the tubes and terminates as soon as the flights have made one complete revolution of 360°. This is to prevent short circuiting of the gases and to insure that all the gases have imparted to them a helicoidal path of movement. Each helicoid is made to fit snugly within its associated tube, being preferably welded thereto. Beyond each helicoid, in the direction of gas flow, are a plurality of tangential slots 21 arranged around the walls of the tubes in series forming helical paths, and in the projected helicoidal paths of the gases in the tubes, substantially as shown in Coward patent, No. 2,284,513, aforesaid. The slots 21 are formed by slitting the metal and turning it outwardly of the tubes as shown in Fig. 2 of the drawing leaving the inner walls of the tubes otherwise smooth. This is important for the reason that any projection within a tube creates resistance to the flow of the gases and eddy currents therein which prevent the discharge of solids therefrom.

Figure 2:
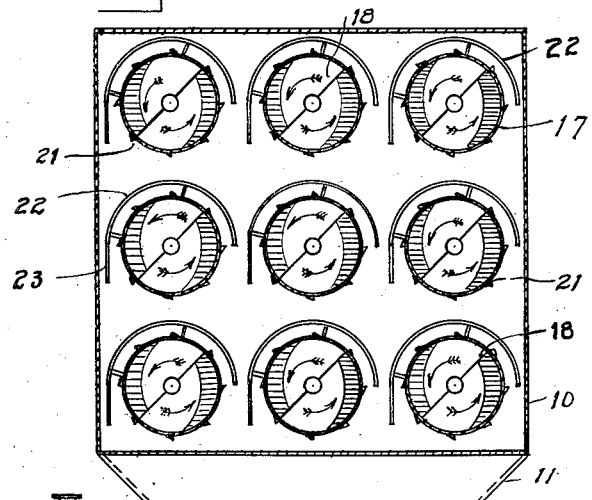
Fig. 2 is a sectional view taken along the line II—II of Fig. 1.

As viewed in Fig. 2 of the drawing, it will be seen that the helicoids 18 there shown impart a counter-clockwise direction of flow to the gases and that the solids discharged through the slots 21 from one tube, would meet and interfere with solids discharged from an adjacent tube unless some provision is made to prevent it. In order to overcome this difficulty, I provide over each of the tubes 17 a hood 22, spaced from its associated tube as shown. The hood 22 is semi-cylindrical in shape over the upper half of each tube and on its left side, as viewed in Fig. 2, or the side from which the slots 21 discharge solids in a downward direction, is provided a downwardly extending tangential plate 23. Solids discharged through the side slots impinge against the plate and are deflected downwardly to the outlet from the casing 10.

Figure 3:
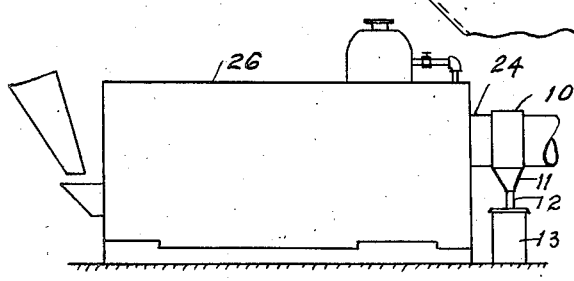
Fig. 3 is a view drawn to a smaller scale showing the apparatus as applied to a boiler having a horizontal offtake flue.

My improved apparatus may be installed in the horizontal breeching or gas offtake 24 from a boiler furnace 26 as shown in Fig. 3 of the drawing. In order to reduce the resistance to flow through the tubes and to cut down the draft loss, I flare the entrance ends of the tubes 17 into a bell shape as shown at 27. I have found that by this means I can reduce the draft loss by as much as 50%.

Inasmuch as the lengths of the helicoids 18 are determined by their respective diameters, the length of the apparatus is determined by the diameters of the tubes; the smaller the diameter of the tubes 17, the less horizontal space in the breeching 24 the apparatus will occupy. As a limiting factor, the greater the number of tubes 17 employed, the greater will be the resistance to flow and consequently the greater the draft loss through the apparatus. Accordingly, it will be seen that the tubes 17 should be designed as large as possible within the limits of horizontal dimension available for installing the apparatus. Generally speaking, a tube diameter of nine to ten inches with a helix pitch of around sixteen inches will be found to be satisfactory, as this provides a longitudinal dimension for the apparatus not exceeding four feet, and that much space is available with most boilers.

The operation of apparatus made in accordance with my invention will be apparent. Gases leaving the furnace 26, laden with fly ash, pass through the tubes 17, around the helicoids 18, having a helicoidal path of movement imparted to them. The fly ash is thrown to the outer layer of the gas stream, and out through the slots 21 by centrifugal force whence it is deflected downwardly to fall by gravity to the bottom of the casing, and thence into the receptacle 13. The efficiency of the apparatus is extremely high, being capable of removing from 80 to 90 per cent of the solids from the combustion gases of a furnace of the character described and abating what would otherwise be a nuisance.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A fly ash collector comprising a casing having a bottom outlet, a plurality of horizontal tubes in the casing, means to pass gases bearing solids in suspension through said tubes, a helicoid disposed snugly in each tube near the entrance end thereof and terminating short of the discharge end thereof to impart a helicoidal direction of travel to the gases, tangential slots formed in the walls of said tubes beyond the helicoids in the general direction of flow of the gases, and disposed to separate the solids from the gases and discharge them through said slots, and a hood over each tube disposed to deflect the discharged solids downwardly toward the outlet.

2. A fly ash collector comprising a casing having a bottom outlet adapted to be disposed in the horizontal combustion gas offtake from a furnace, tube sheets at the ends of the casings, a plurality of horizontal tubes mounted in the tube sheets, a helicoid mounted in the entrance end of each of the tubes and adapted to impart a helicoidal path of movement to the gases leaving the furnace, a series of tangential slots formed in each of the tubes beyond the helicoid in the direction of gas flow, and a hood over each of said tubes disposed to deflect downwardly solids discharged from the gas stream through the slots.

3. A fly ash collector comprising a casing having end and side walls, a top wall and a hopper bottom, said casing being adapted to be positioned in a horizontal flue from a combustion furnace, a plurality of horizontally disposed tubes mounted in the end walls and extending through the casing, a helicoid fitting closely in each of the tubes and adapted to impart a helicoidal path of movement to gases flowing therethrough, a series of tangential slots formed in each of the tubes beyond the helicoid in the direction of gas flow, and a hood over each tube, positioned to deflect solids downwardly which are discharged through the slots.

4. A fly ash collector comprising a casing having end and side walls, a top wall and a hopper bottom, said casing being adapted to be positioned in a horizontal flue from a combustion furnace, a plurality of horizontally disposed tubes mounted in the end walls and extending through the casing, a helicoid fitting closely in each of the tubes, and adapted to impart a helicoidal path of movement to gases flowing therethrough, a series of tangential slots formed in each of the tubes beyond the helicoid in the direction of gas flow, a semi-cylindrical hood over each tube for deflecting solids downwardly which are discharged through the slots, and a plate tangential to each hood depending downwardly from the side of the hood where solids are discharged downwardly from the slots.

5. Apparatus as defined in claim 3 in which the tubes are arranged in regular vertical and horizontal rows.

ELLIS W. BULLOCK.